(12) United States Patent
Forsberg

(10) Patent No.: US 6,612,925 B1
(45) Date of Patent: Sep. 2, 2003

(54) COMPUTER GAME

(75) Inventor: Charles Forsberg, Lancaster (GB)

(73) Assignee: Covepath Limited, Lancaster (GB)

( * ) Notice: Subject to any disclaimer, the term of this patent is extended or adjusted under 35 U.S.C. 154(b) by 0 days.

(21) Appl. No.: 09/787,862

(22) PCT Filed: Sep. 21, 1999

(86) PCT No.: PCT/GB99/03136

§ 371 (c)(1),
(2), (4) Date: Jun. 20, 2001

(87) PCT Pub. No.: WO00/16869

PCT Pub. Date: Mar. 30, 2000

(30) Foreign Application Priority Data

Sep. 22, 1998 (GB) ............................................. 9820490

(51) Int. Cl.$^7$ ................................................ A63F 13/00
(52) U.S. Cl. ............................................ 463/6; 434/62
(58) Field of Search ........................ 463/6, 1; 434/29, 434/37, 62

(56) References Cited

U.S. PATENT DOCUMENTS

| | | | | |
|---|---|---|---|---|
| 4,599,070 A | * | 7/1986 | Hladky et al. | 434/45 |
| 4,814,896 A | | 3/1989 | Heitzman et al. | |
| 5,017,141 A | * | 5/1991 | Relf et al. | 434/29 |
| 5,526,479 A | * | 6/1996 | Barstow et al. | 395/152 |
| 5,613,909 A | * | 3/1997 | Stelovsky | 463/1 |
| 5,616,078 A | * | 4/1997 | Oh | 463/8 |
| 5,618,179 A | * | 4/1997 | Copperman et al. | 434/69 |
| 5,630,718 A | * | 5/1997 | Montag et al. | 434/2 |
| 5,664,948 A | * | 9/1997 | Dimitriadis et al. | 434/307 |
| 5,690,491 A | * | 11/1997 | FitzGerald et al. | 434/16 |
| 5,860,862 A | * | 1/1999 | Junkin | 463/40 |
| 5,926,401 A | * | 7/1999 | Montag et al. | 364/578 |
| 5,947,825 A | * | 9/1999 | Horstmann et al. | 463/42 |
| 6,080,063 A | * | 6/2000 | Khosla | 463/42 |
| 6,155,927 A | * | 12/2000 | Levasseur et al. | 463/42 |
| 6,171,186 B1 | * | 1/2001 | Kurosawa et al. | 463/31 |
| 6,179,619 B1 | * | 1/2001 | Tanaka | 434/69 |
| 6,434,398 B1 | * | 8/2002 | Inselberg | 455/517 |

FOREIGN PATENT DOCUMENTS

| | | |
|---|---|---|
| EP | 0 696 022 | 2/1996 |
| WO | WO 98/46029 A1 | 10/1998 |

* cited by examiner

Primary Examiner—Gene Mancene
Assistant Examiner—Frederick C. Nicolas
(74) Attorney, Agent, or Firm—Ware, Fressola, Van der Sluys & Adolphson LLP

(57) ABSTRACT

Input data comprising dynamics data taken from at least one actual dynamic vehicle, and position data of the at least one actual dynamic vehicle, and data relating to the environment of the at least one actual dynamic vehicle is acquired and at least the dynamics data is utilized by computer game software to generate a user controlled dynamic vehicle. At least the environmental data is converted into a form suitable for display on a display device. User input means provides control signals for the user controlled vehicle to facilitate competing in the same environment as the actual dynamic vehicle as reproduced on a display device before the user. More particularly, the input data is converted into a graphical form to display the at least one actual dynamic vehicle in their actual environment or as modified to accommodate the position of the at least one user controlled dynamic vehicle.

15 Claims, 1 Drawing Sheet

COMPUTER GAME

CROSS-REFERENCE TO RELATED APPLICATIONS

Figure 1:
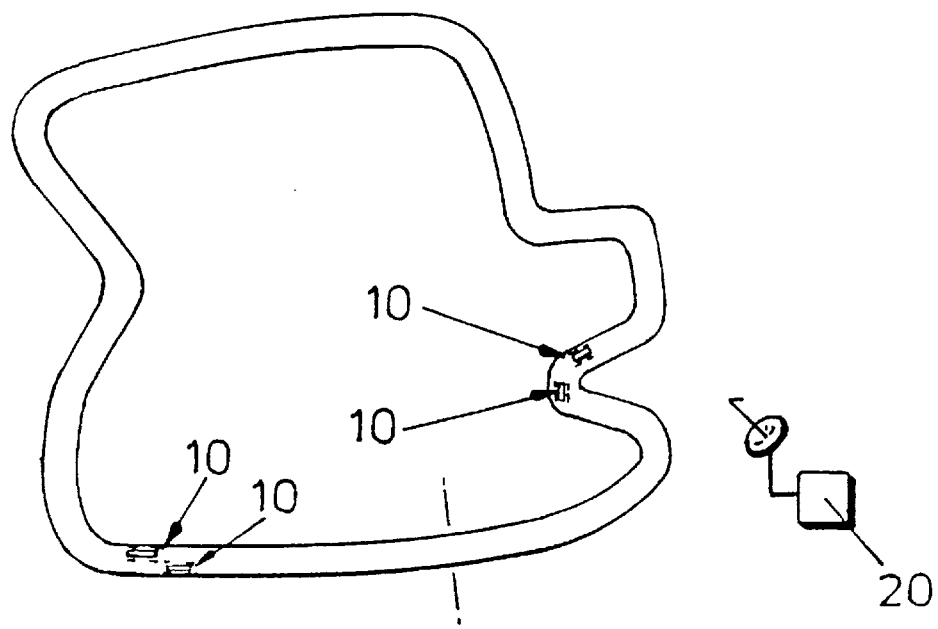

This application is a U.S. national phase filing under 35 U.S.C. §371 of PCT/GB99/03136 filed Sep. 21, 1999, which PCT applications claims foreign priority from Great Britain patent application No. 9820490.2 filed Sep. 22, 1998.

The present invention relates to a Computer Game and in particular to a competitive activity game, such as a race type game, involving dynamics and position.

Computer Race Games are known in which the computer software generates moving graphics representing for example in the case of a motor racing game, a race circuit, and one or more race vehicles. A participant in such a race game operates controls to keep his vehicle on the race track and to negotiate any obstacles. In most cases a competitor is competing against the clock, i.e. not against other human competitors taking part in the same race with whom he has to dice for position. The circuit and any obstacles on the circuit, e.g. other vehicles, which the competitor may have to negotiate are computer generated.

Furthermore the characteristics of the simulated race vehicles are only approximate to the actual dynamics of the vehicles which the game seeks to imitate. For example in a motor racing game permissible acceleration and deceleration rates, maximum straight line speed and maximum cornering speed may be programmed into the software. Actual vehicle dynamics are considerably more complex. Factors such as pitch, roll, speed, three-dimensional G-force, and yaw angle (skid angle) come into play in an actual vehicle. These characteristics determine the maximum potential speed around a circuit and in particular determine whether a chosen cornering movement or a desired overtaking movement can be implemented.

In an actual motor race, the track conditions and the topography of the race circuit will play a part in determining maximum cornering speeds and the best braking positions for coners.

It is one aim of the present invention to provide a more realistic computer game, be it a race or other competitive activity, by mapping more closely actual dynamics of the moving thing, be it a person, animal or other object. A further aim of the invention is to simulate more accurately an actual race, or any other competitive activity as the case may be. For example in the case of a motor race, say an actual Grand Prix, in such a way that a competitor playing on the computer is actually competing against vehicles and drivers that took part or are taking part in the Grand Prix on a particular circuit and in a particular car.

Accordingly, a first aspect of the present invention provides a computer game comprising game software at least one television screen or other display device, and at least one user input means, an input data set comprising dynamics and position data for actual vehicles and actual race environment/circuit data, the input data being converted into a pictorial or graphical form for display and the game software incorporating means for generating a user controlled vehicle from the input data, and wherein the user input means provides control signals for the user controlled vehicle to facilitate racing alongside graphics of actual race vehicles.

More generally, the techniques which can be used to map vehicle dynamics, position and environment can also be used or adapted to map the dynamics, position and environment of any movable thing be it a person, animal or object, and hereinafter is referred to as a dynamic vehicle.

Accordingly, the present invention also provides a computer game comprising game software, at least one television screen or other display device, at least one user input means, an input data set comprising dynamics data taken from at least one actual dynamic vehicle, and position data of the at least one actual dynamic vehicle, and data relating to the environment of the at least one actual dynamic vehicle, at least the environment data being converted into a form suitable for display on the television screen in a pictorial manner, and wherein the game software operates to generate a user controlled dynamic vehicle utilising at least the dynamics data of the input data set, and wherein the user input means provides control signals for the user controlled dynamic vehicle to facilitate competing in the same environment as the actual dynamic vehicle as portrayed on the display device.

The actual dynamic vehicle will depend on the type of competitive activity which is being represented. In the case of motor racing it will be the motor car. In the case of horse racing it will be the horse, but the actual dynamic vehicle may also be a person for competitive activities such as rock/mountain climbing, skiing, athletics or swimming. The technique can be applied to sailing, aerobatics and other types of flying. The data relating to the environment of the actual dynamic vehicle will usually be a pictorial image of the environment in which the activity of the actual dynamic vehicle takes place, taken from one or more view points. For example, in the case of a motor race it will be a view of the race circuit usually as it would be seen by the driver of the vehicle having regard to its position on the race track. Similarly, in the case of the view from an aircraft or a horse racing track or athletics track. In the case of rock climbing for example, it will be a view of the rocks which are to be climbed say as viewed from an actual rock climber.

Certain competitive activities may require or be suitable for individual performances against the clock or some other performance target. Other activities dictate, or are more readily suited to, the user controlled dynamic vehicle competing along with the representations of the actual dynamic vehicles. In the case of the former, the input data relating to actual vehicle dynamics is used to set the performance limitations of the user controlled dynamic vehicle. Where the performance is related to position data, this will be incorporated. For example, in the case of motor racing, the maximum cornering forces can be different for different coners.

In the case of activities calling for a user controlled dynamic vehicle to compete against the actual dynamic vehicle or vehicles, the input data set is converted into a graphical or pictorial form to display the actual dynamic vehicle or vehicles in their actual activity environment, usually with their position being shown relative to the viewpoint of the user controlled dynamic vehicle.

The actual dynamic vehicle performance and/or position data is used to control the graphic output and also allows a vehicle's varying performance to be incorporated in the game to give a compensatory style in which the user's (game player's) input may be combined with either the actual data or a modified version of the actual data.

The vehicle may be any vehicle for movement on land, sea, air or space. In one embodiment the actual vehicle dynamics data and position data is preferably acquired by apparatus installed on actual vehicles. The sensors can measure data such as position, pitch, roll, heading, speed, 3-D G-forces, yaw angle which data is representative of the vehicle dynamics and therefore representative of the actual motion of each vehicle. The data can be gathered at any appropriate rate but typically at 0.1–1000 Hz. By using this information it is possible to describe the vehicle dynamic behaviour. Position data can be partly gathered using various means such as GPS (Global Positioning System), Glonass (Russian equivalent of GPS) and any past or future navigation system. This will enable navigation of a point on the vehicle and further sensors, for example six axis motion reference units (MRU's), gather the remaining dynamics data. This data can be very accurate. Other systems could be used to gather this data such as lasers, optics, gyros and accelerometers etc. In an alternative embodiment the position data may be acquired by equipment disposed externally of the vehicle, for example by a method of tracking based upon stereoscopic cameras or similar that allow image interpretation.

The information generated is sufficiently precise to give the location of a vehicle and its dynamic characteristics at any instant in time. This can be correlated with visual position information. The information generated can be stored on board in a raw or processed form. The data may be passed to a radio modem for transmission to a central collector. The owner can supply the data to television or other broadcasting media to render the motion, or motion based on this information, in graphical form on their display(s). In this context graphical may be moving images as seen from an actual vehicle. This information can be used to compute the view from a simulated vehicle. The information may be broadcast in real time, in delayed transmission form or downloaded on to a data storage medium for later use. The result is real-time vehicle navigation data which may be used for the purpose of real-time or delayed television graphical .and graphics orientated entertainment display. According to one aspect of the present invention this data is used by game program software to result in a more realistic race game simulation. More particularly it permits the user to interact with the displayed information. This may be for purposes of education, general use or entertainment by way of interactive software that accommodates single or multiple instrumented vehicles with simulated vehicle dynamics created by the interactive user. More particularly where the data is broadcast in real time the user can compete in real time against actual competitors in a particular race in question.

The data may be broadcast at or near the time of generation by analog or digital television, telephone, satellite, radio or other means of communication, for example, the internet, to accommodate users who wish to participate remotely in the events. In most cases the data will be collected by a server which would then disseminate the data to the users. In all probability the data will have to be blurred so that it does not show the precise characteristics of an actual vehicle or its driver, simply due to the fact that there will be a natural prejudice about divulging precise performance specifics that may give advantage to actual competitors. As mentioned above, the events may comprise the likes of motor racing, yachting, flying but without limitation to same. The invention may be applied to any type of race game or other activity which utilises the motion of vehicles be they for movement on land, sea or in the air, i.e. where simulated vehicle dynamics are called for. The invention makes it possible for someone to participate, and even compete, remotely in activities involving vehicles, e.g. a pilot of an aircraft in real air combat manoeuvres or as a driven in an actual motor racing event as it occurs or at a later time.

Thus implementation of the invention requires the collection and disemination of vehicle dynamics and position data and software to use the data to facilitate display on screen of actual events occurring in space and time the participant vehicle. The latter may be a simulated vehicle where performance characteristics as derived from the received data, or one of the actual vehicles taking part in the event but where the required control inputs are determined by the participant albeit that the ultimate performance parameters are equal to that of the actual vehicle.

To allow such audience participation the computer package would have intelligence sufficient to allow the participant(s) room to manoeuvre against other broadcast, and provably remote, vehicles without unnecessarily over running their displayed images and in a realistic manner. A dynamics engine can be employed which uses real data from the actual dynamic vehicle to define any user's method(s) of how a vehicle is driven. Preferably the data from one or more actual dynamics vehicles is stored to build up a library of experience of previous competitions or participation which can be used to modify a users behaviour when it is input. This can also be used to ensure that the actual contender's images are not overrun the computer rendition. Alternatively, the real-time data may be used to define the performance behaviour of actual contenders in a manner that allows users eg. remote participants, to "inherit" characteristics from real-time contenders. The broadcast or replayed vehicle dynamics data would be used to generate realistic or other dynamics that would allow avoidance, if appropriate, of the participants simulated vehicle dynamics. The end result would be a combination of real vehicle dynamics data and intelligently simulated vehicle dynamics with the capability for multiple users to participate at one or many display terminals simultaneously or individually as the time the broadcast event occurs or close to it. In certain circumstances it may be preferable to let a user controlled vehicle overrun actual vehicles.

Figure 2:
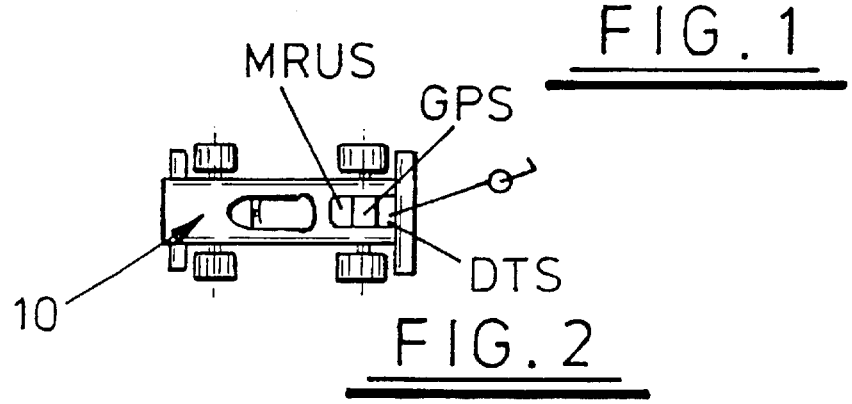
Figure 3:
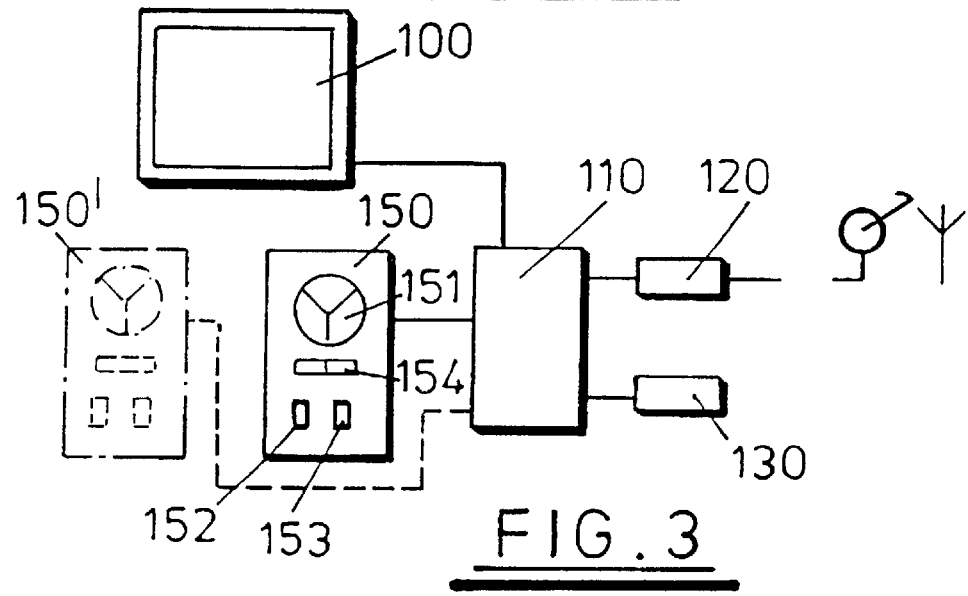

The present invention will now be described further hereinafter by way of example only with reference to the accompanying drawings; in which:

FIG. 1 illustrates a diagrammatically motor racing circuit and four racing cars, FIG. 2 is a diagrammatical illustration of one of the vehicles shown in FIG. 1, and FIG. 3 illustrates a game apparatus for use in the invention.

For convenience the present invention will be described hereinafter in relation to its application to motor racing but other applications will be apparent to a skilled reader. FIG. 1 is intended to represent an actual motor racing circuit, for example any circuit at which a round of Formula 1 Grand Prix Racing is held. A typical Grand Prix race will have twenty racing cars competing but for convenience of illustration only four cars are shown at 10 in the illustration. An enlarged diagrammatic representation of one car is shown in FIG. 2. The car is provided with a plurality of Motion Reference Units (MRU's), a Global Positioning System (GPS), and a Data Transmission Device (DTS). The GPS gathers actual position data in a world reference framework. Utilising this system, the position data can be gathered in real-time and without modification passed on as actual position data. The Motion Reference Units gather the vehicle dynamics data and in particular data relating to pitch, roll, heading, speed, 3-D G-forces and yaw angle. Using this systen the dynamics data can be gathered in real-time. The data collection rate is typically at 0.1–1000 Hz but may be at another more suitable rate. Preferably the MRU's are 6 axis devices but where coarser measurements are sufficient fewer axis devices may be utilised. The data may be transmitted to a local receiver such as that illustrated at 20 in FIG. 1 for onward transmission say as a satellite transmission. Alternatively the data may be transmitted directly from each vehicle (10) to a remote receiving unit. Preferably the receiving unit collects the data received from all the vehicles as they move around the circuit. Thus the vehicle dynamics are correlated to circuit position. Software is used to convert this data into a graphical form suitable for displaying on a television screen or other media display device. A camera on each car records the view from the vehicle. This data is also transmitted. The conversion may take place before transmission from the receiving unit or form part of game software.

The transmitted data is used by software programming to generate a simulated dynamics profile for each vehicle or for a simulated vehicle and thereby make possible a computer game in which one or more users may compete against other vehicles for which actual vehicle dynamics and position data have been provided. To allow such audience participation the software would have sufficient intelligence to allow the participants room to manoeuvre their vehicle in relation to the actual vehicles and other simulated vehicles preferably without unnecessary overrunning their displayed images.

Referring now to FIG. 3 a television monitor is shown at 100, a computer at 110, a data decoder unit at 120, a memory at 130 and user control module at 150 more than one user control module may be provided as indicated by dotted outline 150'. The transmitted data may be a digital or analogue signal end is received by the data decoder unit 120. The data transmitted may be transmitted in real time or on a delayed broadcast basis. On the other hand the data may be stored on a CD Rom or other media storage device from which it can be read into computer memory. Software stored in memory 130 and run on CPU 110 facilitates reproduction of the dynamics data graphically on screen 100 if required, and to view on-screen the image from any vehicle taking part in the race for which data has been transmitted. The user may select to take the place of one of the actual vehicle's and to drive it up to its simulated performance characteristics or choose to compete in a simulated vehicle. The view from the simulated vehicle can be computed from the received data. The user is able to control steering inputs 151, braking 152, gear changing 154 and acceleration inputs 153 using the control input means. The provision of more than one control input means facilitates a number of users competing in the race. Other users may be located at a remote location.

From the foregoing it will be apparent that a competitor is able to receive data gathered from actual vehicles participating in an event and to take part in that event in a simulated fashion at a remote location. By controlling in the case of a motor racing game vehicle speed, and direction of movement, the remote competitor is able to position his car amongst the cars that actually competing in the race.

What is claimed is:

1. A computer game comprising game software, at least one display device, at least one user input means, and an input data set comprising dynamics data taken from at least one actual dynamic object, position data of the at least one actual dynamic object, and data relating to an environment of the at least one actual dynamic object, at least the environment data being converted into a pictorial form suitable for display on the at least one display device, and wherein the game software operates to generate a simulated user controlled dynamic object utilizing at least the dynamics data of the input data set, the input data set of the at least one actual dynamic object is used to set performance limitations of the simulated user controlled dynamic object and wherein the at least one user input means provides control signals for the simulated user controlled dynamic object to facilitate competing with the at least one actual dynamic object in the pictorial form as portrayed on the at least one display device.

2. A computer game as claimed in claim 1, in which the game software utilizes both dynamics data and position data.

3. A computer game as claimed in claim 1, in which the input data set is converted into a graphical or pictorial form to display each at least one actual dynamic object in its actual environment.

4. A computer game as claimed in claim 3 in which the position data of each at least one actual dynamic object is modified to accommodate display of the simulated user controlled dynamic object in the pictorial form as portrayed on the at least one display device.

5. A computer game as claimed in claim 1 in which the dynamics data of the at least one actual dynamic object is acquired by apparatus installed on at least one actual dynamic object.

6. A computer game as claimed in claim 5 in which the apparatus comprises sensors to measure at least one of speed, pitch, roll, heading, 3-D G forces, yaw angle and acceleration.

7. A computer game as claimed in claim 1 in which the position data of the at least one actual dynamic object is acquired by apparatus installed on at least one actual dynamic object.

8. A computer game as claimed in claim 7 in which the apparatus for acquiring position data comprises a global position system.

9. A computer game as claimed in claim 1 in which the environment data is acquired by a television camera mounted on the at least one actual dynamic object which is at least one actual dynamic vehicle.

10. A computer game as claimed in claim 1 in which the input data set is transmitted in real-time.

11. A computer game as claimed in claim 1 in which the input data set is transmitted in delayed transmission form.

12. A computer game as claimed in claim 1 in which the input data set is captured onto a data storage medium for later use.

13. A computer game as claimed in claim 1 in which the position data is gathered in real-time and is passed on without modification.

14. A computer game as claimed in claim 1 in which the dynamics data and the position data are gathered simultaneously in real-time.

15. A computer game as claimed in claim 1 in which the at least one display device is a television screen.

* * * * *